US012483819B2

(12) United States Patent
Takahashi et al.

(10) Patent No.: US 12,483,819 B2
(45) Date of Patent: Nov. 25, 2025

(54) EARPHONE AND ACOUSTIC CONTROL METHOD

(71) Applicant: PANASONIC INTELLECTUAL PROPERTY MANAGEMENT CO., LTD., Osaka (JP)

(72) Inventors: Takeshi Takahashi, Fukuoka (JP); Shigeki Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 233 days.

(21) Appl. No.: 18/334,001

(22) Filed: Jun. 13, 2023

(65) Prior Publication Data

US 2023/0403494 A1 Dec. 14, 2023

(30) Foreign Application Priority Data

Jun. 13, 2022 (JP) ................................ 2022-095152

(51) Int. Cl.
*H04R 1/10* (2006.01)

(52) U.S. Cl.
CPC ......... *H04R 1/1041* (2013.01); *H04R 1/1016* (2013.01)

(58) Field of Classification Search
CPC ............................ H04R 1/1041; H04R 1/1016
See application file for complete search history.

(56) References Cited

U.S. PATENT DOCUMENTS

2007/0177753 A1* 8/2007 Weinans .............. H04R 1/1041 381/372
2012/0082335 A1* 4/2012 Duisters ............... H04R 1/1041 381/375
2020/0213731 A1* 7/2020 Miller ................. G10L 21/0232
2020/0245052 A1* 7/2020 Grinker ................ H04R 1/1016
2021/0029440 A1* 1/2021 Fukui ................... H04R 1/1041

FOREIGN PATENT DOCUMENTS

JP 2009525629 A 7/2009

OTHER PUBLICATIONS

Extended European Search Report dated Nov. 3, 2023, for the corresponding European Patent Application No. 23178672.4, 10 pages.

* cited by examiner

*Primary Examiner* — Simon King
(74) *Attorney, Agent, or Firm* — Seed Intellectual Property Law Firm LLP

(57) ABSTRACT

An earphone includes a housing having a space therein and having a path capable of ventilation from one end side on an external auditory canal side of a wearer to the other end side on an ambient environment side, a valve accommodated in the housing and configured to switch the path between an open state and a close state, a microphone disposed on one end side of the housing and configured to collect uttered voice of the wearer, and a control unit configured to control the open state and the close state. The control unit switches the path to the open state during a first operation in a call including an operation in which the uttered voice of the wearer is collected by the microphone, and switches the path either the open state or the close state during a second operation different from the first operation.

13 Claims, 16 Drawing Sheets

FIG. 8

TBL1

| PLAYBACK STATE | NOISE CANCELLATION MODE | AMBIENT SOUND CAPTURE MODE | OFF MODE |
|---|---|---|---|
| DURING MUSIC PLAYBACK | CLOSE | OPEN | CLOSE |
| IN CALL | OPEN | OPEN | OPEN |

FIG. 11

TBL2

| PLAYBACK STATE | NOISE CANCELLATION MODE | AMBIENT SOUND CAPTURE MODE | | OFF MODE |
|---|---|---|---|---|
| | | CLOSED MODE | OPENED MODE | |
| DURING MUSIC PLAYBACK | CLOSE | CLOSE | OPEN | CLOSE |
| IN CALL | OPEN | OPEN | OPEN | OPEN |

FIG. 15

TBL3

| PLAYBACK STATE | NOISE CANCELLATION MODE | AMBIENT SOUND CAPTURE MODE | | | | OFF MODE |
|---|---|---|---|---|---|---|
| | | SUB-MODE A | | SUB-MODE B | | |
| | | SETTING "OPEN" | SETTING "CLOSE" | SETTING "OPEN" | SETTING "CLOSE" | |
| DURING MUSIC PLAYBACK | CLOSE | OPEN | CLOSE | OPEN | CLOSE | CLOSE |
| IN CALL | OPEN | OPEN | OPEN | OPEN | OPEN | OPEN |

EARPHONE AND ACOUSTIC CONTROL METHOD

CROSS-REFERENCE TO RELATED APPLICATIONS

This application is based on and claims priority under 35 USC 119 from Japanese Patent Application No. 2022-095152 filed on Jun. 13, 2022, the entire content of which is incorporated herein by reference.

TECHNICAL FIELD

The present disclosure relates to earphones, an acoustic control method, and a program.

BACKGROUND ART

Patent Literature 1 discloses earphones that can be connected to a device such as a mobile phone. The earphones include a housing that is shaped and configured so as to substantially cover an external auditory canal, that accommodates a speaker element which emits a sound to the external auditory canal, and that includes a channel extending from an inner end facing an external auditory canal side to an outer end facing a peripheral side, and a closing unit that switches between a closed state in which the channel is substantially closed and an opened state in which the channel transmits a sound from the periphery. The earphones are automatically switched to the opened state when the device is in a phone operation mode, and is automatically switched to the closed state when the device is in an audio player operation mode.

CITATION LIST

Patent Literature

Patent Literature 1: JP2009-525629A

SUMMARY OF INVENTION

In recent years, an earphone is often equipped with a noise cancellation technique for making it difficult for a wearer to hear a sound outside the earphone as much as possible. In addition, an earphone equipped with a microphone for collecting an uttered voice of a wearer has also appeared. This is considered to allow a wearer to easily participate, for example, in a remote conference performed at the time of teleworking or the like which is widely used nowadays in a state of wearing an earphone.

However, many earphones still close the ear of the wearer in order to block an ambient sound as much as possible. For this reason, when the earphone is worn in a form of closing the ear in the above remote conference or the like, a voice (uttered voice) when the wearer utters by himself/herself does not enter from the outside of the ear of the wearer, the uttered voice arriving at the eardrum along the body of the wearer is in a state of being reverberated in the ear of the wearer, and the wearer has an uncomfortable feeling that the voice uttered by himself/herself drones. Even during music playback, which is not during utterance, it may be considered to be preferable to selectively use a state in which an ambient sound is captured and a state in which an ambient sound is blocked conversely depending on an environment in which the wearer uses the earphone or the preference of the wearer.

The present disclosure has been made in view of the above situation in the related art, and an object thereof is to adaptively adjust the ease of listening to a sound in accordance with a usage situation of a wearer, and to prevent the wearer from feeling uncomfortable.

The present disclosure provides an earphone including a housing having a space therein and having a path capable of ventilation from one end side on an external auditory canal side of a wearer to another end side on an ambient environment side; a valve accommodated in the housing and configured to switch the path between an open state and a close state; a microphone disposed on one end side of the housing and configured to collect uttered voice of the wearer; and a control unit configured to control the open state and the close state. The control unit is configured to switch the path to the open state during a first operation in a call including an operation in which the uttered voice of the wearer is collected by the microphone, and switch the path either the open state or the close state during a second operation different from the first operation.

Further, the present disclosure provides an acoustic control method for an earphone which includes a housing having a space therein and having a path capable of ventilation from one end side on an external auditory canal side of a wearer to the other end side on an ambient environment side, and a valve accommodated in the housing and configured to switch the path between an open state and a close state. The acoustic control method includes switching the path to the open state during a first operation in a call including an operation in which an uttered voice of the wearer is collected by a microphone disposed on one end side of the housing and configured to collect the uttered voice of the wearer, and switching the path either the open state or the close state during a second operation different from the first operation.

Furthermore, the present disclosure provides a computer readable storage medium on which a computer program that causes an earphone which includes a housing having a space therein and having a path capable of ventilation from one end side on an external auditory canal side of a wearer to the other end side on an ambient environment side, and a valve accommodated in the housing and configured to switch the path between an open state and a close state to execute the following steps is stored. The steps includes switching the path to the open state during a first operation in a call including an operation in which an uttered voice of the wearer is collected by a microphone disposed on one end side of the housing and configured to collect the uttered voice of the wearer; and switching the path either the open state or the close state during a second operation different from the first operation.

These comprehensive or specific aspects may be implemented by a system, an apparatus, a method, an integrated circuit, a computer program, or a recording medium, or any combination of the system, the apparatus, the method, the integrated circuit, the computer program, and the recording medium.

According to the present disclosure, it is possible to adaptively adjust the ease of listening to a sound in accordance with a usage situation of a wearer, and to prevent the wearer from feeling uncomfortable.

BRIEF DESCRIPTION OF DRAWINGS

FIG. 8 is a diagram showing a correspondence table showing a relation example between the acoustic modes and operations of the earphone according to the first operation example;

FIG. 11 is a diagram showing a correspondence table showing a relation example between the acoustic modes and operations of the earphone according to the second operation example;

FIG. 15 is a diagram showing a correspondence table showing a relation example between the acoustic modes and operations of the earphone according to the third operation example.

DESCRIPTION OF EMBODIMENTS

An embodiment specifically disclosing an earphone, an acoustic control method, and a program according to the present disclosure will be described in detail below with reference to the drawings as appropriate. However, unnecessarily detailed description may be omitted. For example, detailed descriptions of well-known matters and redundant descriptions of substantially the same configuration may be omitted. This is to avoid unnecessary redundancy of the following descriptions and to facilitate understanding of those skilled in the art. The accompanying drawings and the following descriptions are provided for those skilled in the art to fully understand the present disclosure, and are not intended to limit the subject matter described in the claims.

Figure 1:
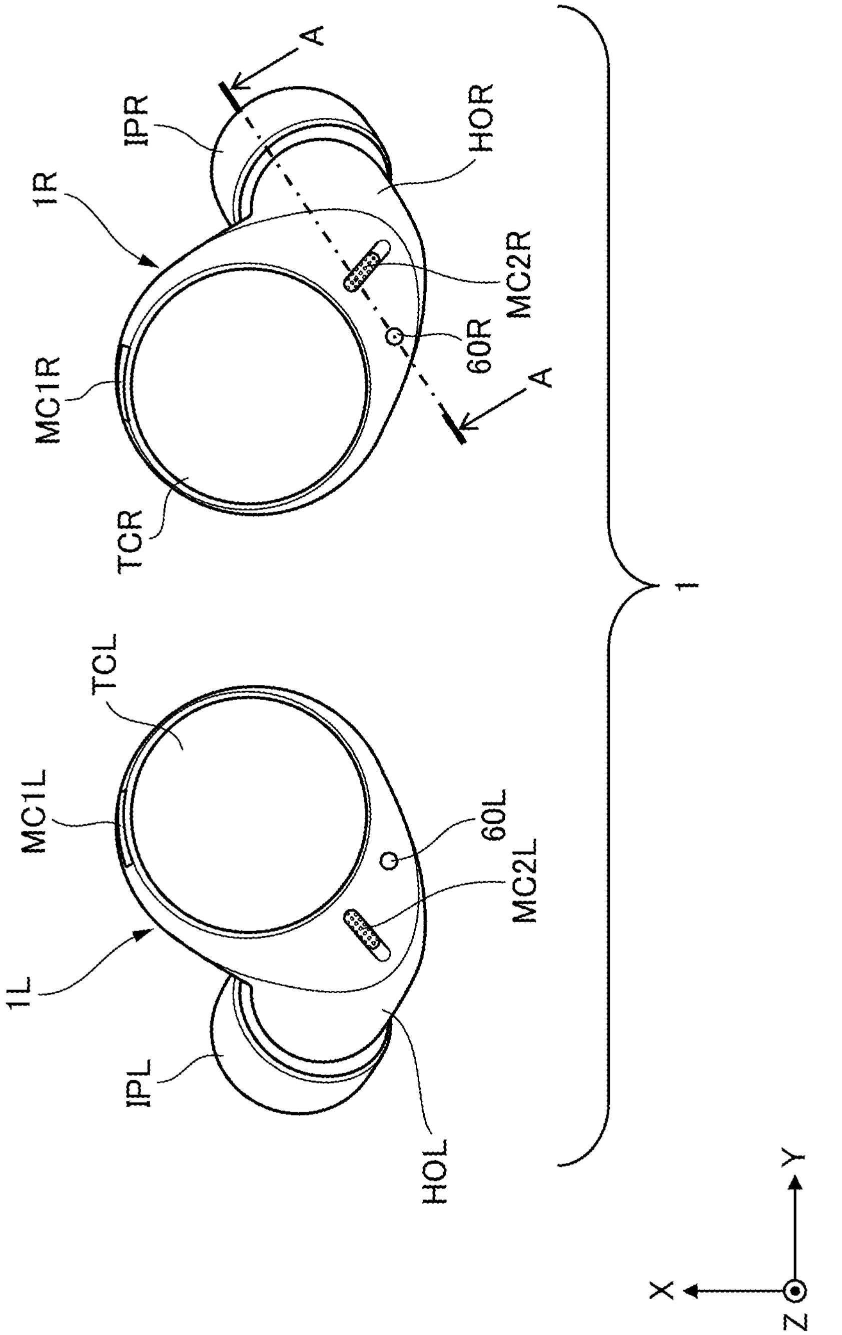
FIG. 1 is a front view of earphones.
Figure 2:
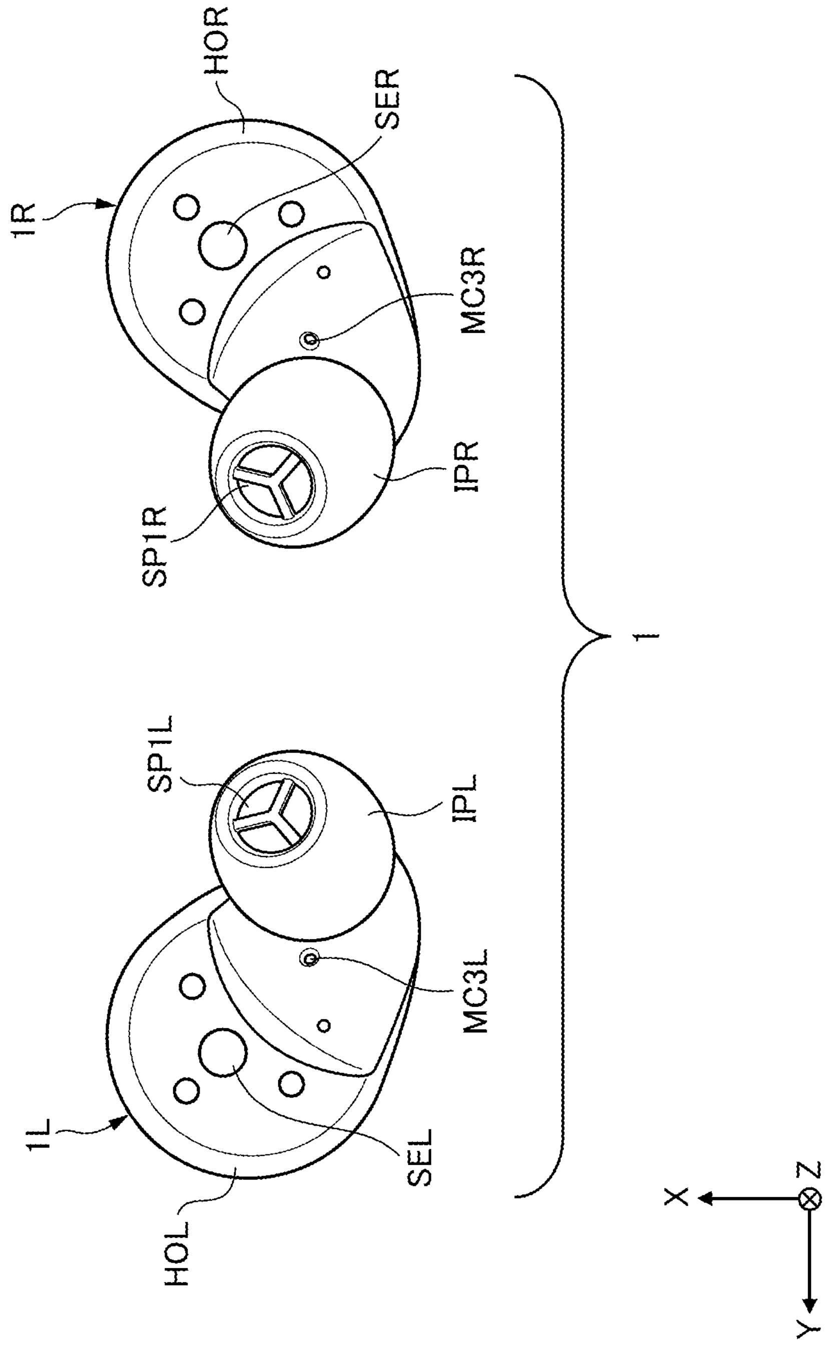
FIG. 2 is a rear view of the earphones.

First, a hardware configuration example of an earphone will be described with reference to FIGS. 1 and 2. FIG. 1 is a front view of the earphone. FIG. 2 is a rear view of the earphone. FIGS. 1 and 2 show that earphones 1L and 1R are arranged side by side, and an entire surface of each of touch sensors TCL and TCR is arranged to face a front side of a paper surface.

For convenience of explanation, as shown in FIG. 1, an X axis and a Y axis are defined along a plane parallel to a surface of the touch sensor TCL of the earphone 1L, and an axis orthogonal to the surface of the touch sensor TCL is defined as a Z axis. In the earphone 1L, when a microphone MC1L side of the touch sensor TCL is defined as an upper end side and a microphone MC2L side opposite to the microphone MC1L side of the touch sensor TCL is defined as a lower end side, a direction from the lower end side toward the upper end side is defined as an X axis. A direction orthogonal to both the Z axis and the X axis is defined as a Y axis. The definitions of the X, Y, and Z axes can be similarly applied to the earphone 1R. In the present embodiment, a direction of the earphone 1L in FIG. 1 is defined as a front view. The expressions related to these directions are used for convenience of explanation, and are not intended to limit a posture of the structure in actual use. The same applies to other drawings.

In the present embodiment, the earphone 1L for a left ear and the earphone 1R for a right ear of the pair of left and right earphones 1L and 1R have the same configuration. The reference numerals of the same components are expressed with "L" at the end of the earphone 1L for a left ear and with "R" at the end of the earphone 1R for a right ear. In the following description, only the left earphone 1L is described, and the description of the right earphone 1R is not described.

An earphone 1 includes the earphones 1L and 1R which are worn on a left ear and a right ear of a user, respectively, and in which a plurality of earpieces having different sizes are interchangeably worn on one end sides of the respective earphones. Specifically, the earphone 1 may include two independently operable earphones (that is, the earphone 1L and the earphone 1R) of the earphone 1L worn on the left ear of the user and the earphone 1R worn on the right ear of the user. In this case, the earphone 1L and the earphone 1R can communicate with each other wirelessly (for example, short-range wireless communication such as Bluetooth (registered trademark)). The earphone 1 may include a pair of earphones in which the earphone 1L and the earphone 1R are connected by wire (in other words, a cable such as a wire).

As shown in FIG. 1, the earphone 1L is an inner type acoustic device used by being worn on the ear of the user, and receives sound data (for example, music data) transmitted wirelessly (for example, short-range wireless communication such as Bluetooth (registered trademark)) from an external device such as a smartphone or a portable music player carried by the user. The earphone 1L acoustically outputs a sound signal based on the received sound data. When not in use, the earphone 1L is placed on a cradle (not shown) which is a charging case. When the earphone 1L is placed at a predetermined placement position of the cradle in a case where a battery B1L (FIG. 5) incorporated in the earphone 1L is not fully charged, the battery B1L incorporated in the earphone is charged based on electric power transmitted from the cradle.

The earphone 1L includes a housing HOL as a structural member thereof. The housing HOL is made of a composite of materials such as synthetic resin, metal, and ceramic, and an accommodation space that accommodates various members constituting the earphone 1L is formed therein. The housing HOL is provided with an attachment cylindrical portion FCL1 (see FIGS. 3 and 4) communicating with the accommodation space. The attachment cylindrical portion FCL1 is provided on one end side of the housing HOL opposite to the touch sensor TCL to be described later.

The earphone 1L includes an earpiece IPL attached to a main body of the earphone 1L. For example, the earphone 1L is held in a state of being inserted into an external auditory canal through the earpiece IPL with respect to the ear of the user, and this held state is a used state of the earphone 1L.

The earpiece IPL is made of a flexible member such as silicon, and is injection-molded with an inner tubular portion (not shown) and an outer tubular portion (not shown). The earpiece IPL is fixed by being inserted into the attachment cylindrical portion FCL1 of the housing HOL at the inner tubular portion thereof, and is provided to be replaceable (detachable) with respect to the attachment cylindrical portion FCL1 of the housing HOL. The earpiece IPL is worn in the external auditory canal of the user at the outer tubular portion thereof, and is elastically deformed depending on a shape of the external auditory canal to be worn. By this elastic deformation, the earpiece IPL is held in the external auditory canal of the user. The earpiece IPL has a plurality of different sizes. The earpiece IPL is worn on the left ear of the user by attaching an earpiece having any size among the earpieces having a plurality of sizes to the earphone 1L.

As an example of an operation input unit, the touch sensor TCL is provided on the other end side of the housing HOL opposite to one end side where the earpiece IPL is arranged as shown in FIG. 1. The touch sensor TCL is a sensor element having a touch sensor function of detecting an input operation by a user (for example, a touch operation). The sensor element is, for example, an electrode of a capacitive touch sensor. The touch sensor TCL may be formed as, for example, a circular surface or an elliptical surface. In addition, the touch sensor TCL may be formed as a rectangular surface.

As the touch operation on the touch sensor TCL by a finger of the user or the like, for example, the following operation is exemplified. When the touch operation is performed for a short period of time, the earphone 1L may instruct the external device to perform playback, stop, next track, or previous track. When the touch operation is performed for a long time (so-called long press touch), the earphone 1L may perform a pairing operation or the like for performing wireless communication such as Bluetooth (registered trademark) with an external device such as a smartphone. When the surface of the touch sensor TCL is traced with a finger (so-called "swiping operation"), the earphone 1L may perform volume adjustment or the like on playing music.

An opening 60L is a hole that is formed to be exposed on the surface of the housing HOL, and leads to a path capable of ventilation from one end side on an external auditory canal side of the user to the other end side on an outside air side (ambient environment side) when being inserted and held in the external auditory canal of the user. A cross section example of a detailed structure of the opening 60L will be described later with reference to FIGS. 3 and 4.

The earphone 1L includes a plurality of microphones (microphone MC1L, microphone MC2L, and microphone MC3L) as electric and electronic members. The plurality of microphones are accommodated in the accommodation space (not shown) of the housing HOL.

As shown in FIG. 1, the microphone MC1L is provided so as to be exposed on the surface of the housing HOL or in the vicinity of the surface of the housing HOL, and is disposed to collect an ambient sound or the like outside the earphone 1L. That is, the microphone MC1L can detect an ambient sound of the user in a state where the earphone 1L is worn on the ear of the user. The microphone MC1L converts the external ambient sound into an electric signal (sound signal) and sends the electric signal to a sound signal input/output control unit S1L.

As shown in FIG. 1, the microphone MC2L is provided so as to be exposed on the surface of the housing HOL or in the vicinity of the surface of the housing HOL, and is disposed to collect a voice signal based on an utterance of a user wearing the earphone 1L. Therefore, the earphone 1L can implement a so-called hands-free call in a state of being capable of communicating with a mobile phone device such as a smartphone F1 of the user. The microphone MC2L is a microphone device capable of collecting (that is, detecting a voice signal) a voice generated based on the utterance of the user. The microphone MC2L collects the voice generated based on the utterance of the user, converts the voice into an electric signal, and sends the electric signal to the sound signal input/output control unit S1L. The microphone MC2L is disposed such that an extending direction of the earphone 1L faces the mouth of the user when the earphone 1L is inserted into the left ear of the user (see FIG. 1), and is disposed at a position of a lower portion of the touch sensor TCL (that is, in the −X direction). The voice uttered by the user is collected by the microphone MC2L and is converted into an electric signal, and presence or absence of the utterance of the user by the microphone MC2L can be detected by a large or small of the electric signal.

As shown in FIG. 2, the microphone MC3L is disposed in a plane near the attachment cylindrical portion FCL1 of the housing HOL, and is disposed as close as possible to the external auditory canal of the left ear when the earphone 1L is inserted into the left ear of the user. The microphone MC3L converts a sound leaked from between the left ear of the user and the earpiece IPL in a state where the earphone 1L is worn on the left ear of the user into an electric signal (sound signal) and sends the electric signal to the sound signal input/output control unit S1L.

As shown in FIG. 2, a speaker SP1L is disposed in the attachment cylindrical portion FCL1 of the housing HOL. The speaker SP1L is an electronic component including a driver SP1LDr (see FIGS. 3 and 4), and acoustically outputs sound data (for example, music data) wirelessly transmitted from an external device. Inside the housing HOL, a front surface (in other words, a sound releasing surface of the sound to be acoustically output) of the speaker SP1 is directed toward an attachment cylindrical portion FCL1 side of the housing HOL covered with the earpiece IPL. Accordingly, the music data acoustically output from the speaker SP1L is transmitted from an ear hole (for example, an external ear) of the user to the external auditory canal of the external ear and an eardrum of a middle ear, and the user can listen to the music data.

A wearing sensor SEL is implemented by a device that detects whether or not an earphone is worn on the left ear of the user, and is implemented using, for example, an infrared sensor or an electrostatic sensor. In the case of an infrared sensor, when the earphone 1L is worn on the left ear of the user, the wearing sensor SEL can detect wearing on the left ear of the user by receiving an infrared light obtained by reflecting an infrared light emitted from the wearing sensor SEL in the left ear. When the earphone 1L is not worn on the left ear of the user, the wearing sensor SEL can detect non-wearing on the left ear of the user by not reflecting an infrared light emitted from the wearing sensor SEL and not receiving the infrared light. On the other hand, in the case of an electrostatic sensor, when the earphone 1L is worn on the left ear of the user, the wearing sensor SEL can detect wearing on the left ear of the user by determining that a change value of an electrostatic capacitance corresponding to a distance to the inside of the left ear of the user is larger than a threshold held by the wearing sensor SEL. When the earphone 1L is not worn on the left ear of the user, the wearing sensor SEL can detect non-wearing on the left ear of the user by determining that the change value of the electrostatic capacitance value is smaller than the threshold held by the wearing sensor SEL. The wearing sensor SEL is provided at a position facing the external auditory canal and on a back surface side of the touch sensor TCL when the earphone 1L is inserted into the left ear of the user.

Figure 3:
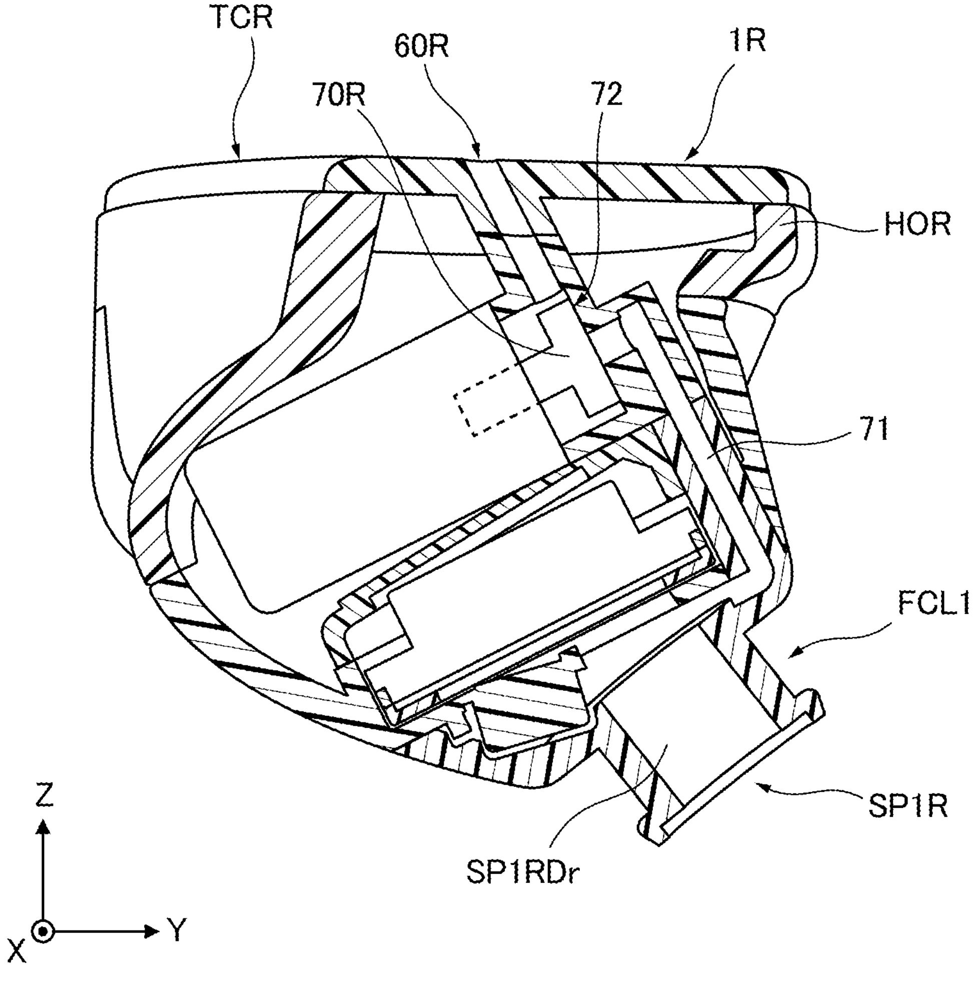
FIG. 3 is a sectional view taken along a line A-A when a valve is in a closed state.
Figure 4:
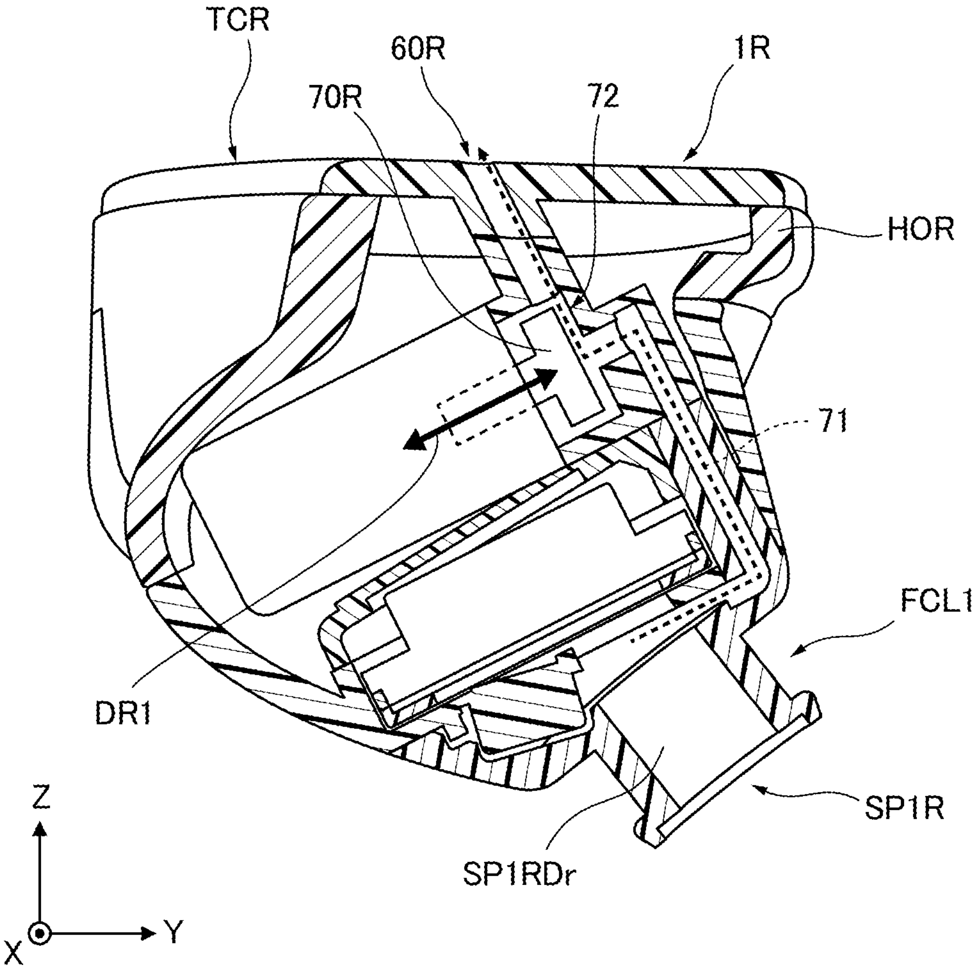
FIG. 4 is a sectional view taken along a line A-A when the valve is in an opened state.

Next, an opened state and a closed state of a valve will be described with reference to FIGS. 3 and 4. FIG. 3 is a sectional view taken along a line A-A when the valve is in the closed state. FIG. 4 is a sectional view taken along the line A-A when the valve is in the opened state. For convenience of explanation, FIGS. 3 and 4 show the earphone 1R, but as described above, the earphones 1L and 1R have the same structure, and the same description can be applied to the earphone 1L. In the following description, the opened state may be referred to as "an open state", and the closed state may be referred to as "a close state". Illustration of the earpieces IPL and IPE (see FIG. 1 and FIG. 2) is omitted in FIGS. 3 and 4.

The sectional view shown in FIG. 3 is a sectional view taken along the line A-A of the earphone 1R in FIG. 1. A valve 70R is a device including a movable mechanism that controls air passing through the path 71. The valve 70R switches the path 71 for releasing the sound remaining in the housing HOR to the outside of the housing HOR between the open state and the close state. The sound remaining in the housing HOR is, for example, an echo sound of a sound output from the driver SP1RDr, or a transmission sound that is acoustically transmitted to the vicinity of the right ear via the body of the user himself/herself by the utterance of the user. The sound causes an uncomfortable feeling or difficulty in listening to an ambient sound when the user utters in a state of wearing the earphone 1R. An operation (specifically, opening and closing) of the valve 70R is controlled by an earphone control unit S2R. The valve may be, for example, a gate valve shown in FIG. 3, and may be a globe valve, a needle valve, a ball valve, or a butterfly valve.

The valve 70R can be brought into the close state by blocking the path 71 by moving back and forth along a direction DR1 (see FIG. 4) and abutting against a wall surface 72. A state shown in FIG. 3 in which the valve 70 abuts against the wall surface 72 and blocks a part of the path 71 is referred to as a "close state". When the user wears the earphone 1R on the right ear and the valve 70 is in the close state, the path 71 is blocked by the valve 70R, and the ear of the user is blocked from the ambient environment (outside air) and sealed.

A state shown in FIG. 4 in which the valve 70R is separated from the wall surface 72 by a certain distance to open the path 71 is referred to as an "open state". When the user wears the earphone 1R on the right ear and the valve 70R is in the open state the path 71 is not blocked by the valve 70R and communicates with the ambient environment (outside air) on a touch sensor TCR side, and thus the ear of the user is not blocked (sealed) from the ambient environment (outside air). In this state, the sound remaining in the housing HOR is released to the outside of the housing HOR via the path 71, and it is expected that, when the user utters in a state of wearing the earphone 1R, it is possible to prevent the user from feeling uncomfortable or difficult to hear an ambient sound.

Figure 5:
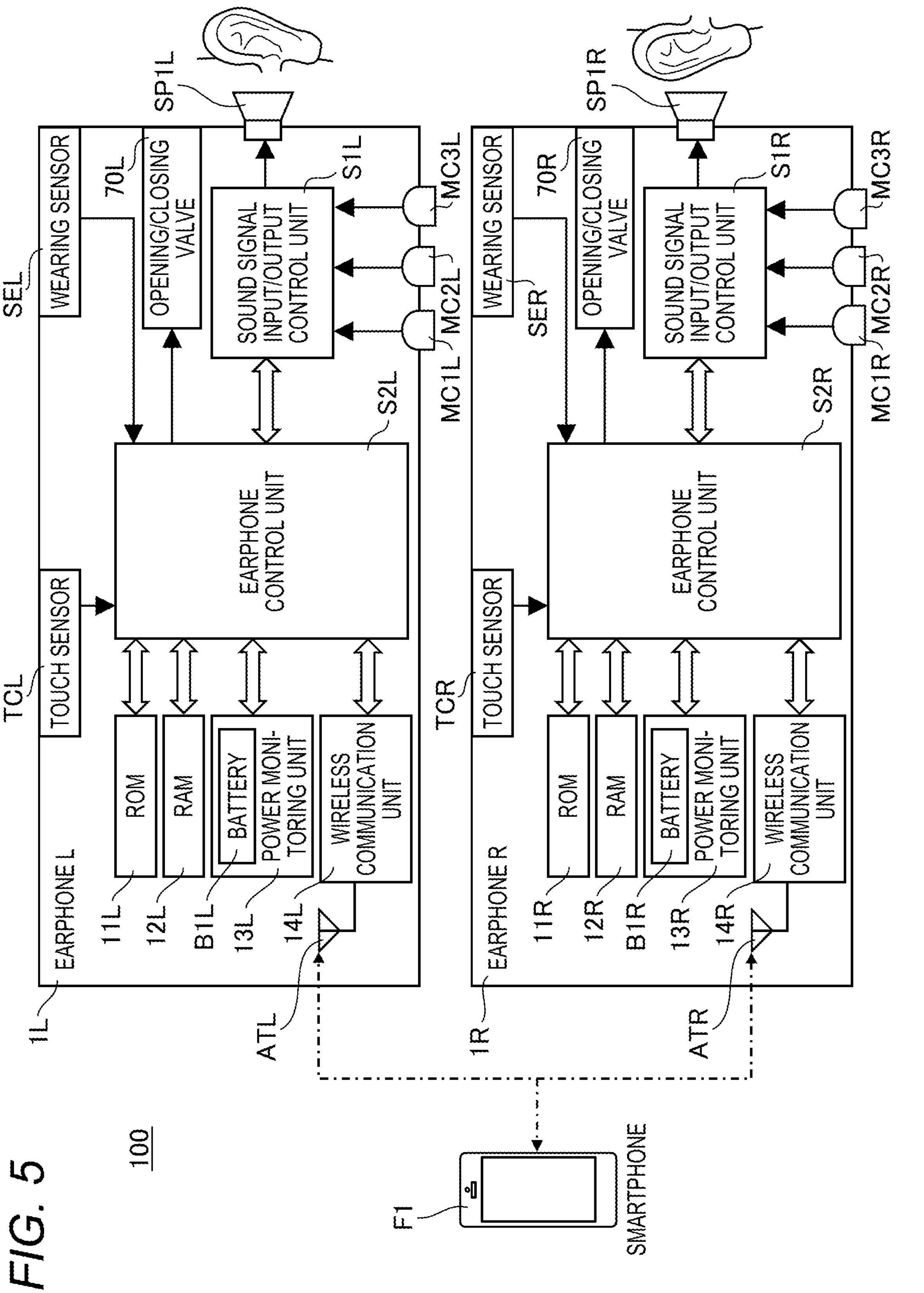
FIG. 5 is a block diagram showing a hardware configuration example of earphones according to the present embodiment.

Next, a hardware configuration example of the earphone will be described with reference to FIG. 5. FIG. 5 is a block diagram showing a hardware configuration example of an earphone according to the present embodiment. Specifically, FIG. 5 is a block diagram showing a hardware configuration example of the pair of left earphone 1L and right earphone 1R shown in FIGS. 1 and 2. Hereinafter, the configuration of the earphone 1L of the pair of left earphone 1L and right earphone 1R will be described, and since the configuration of the earphone 1R is the same as the configuration of the earphone 1L, the description of the configuration of the earphone 1L can be similarly applied to the description of the corresponding components of the earphone 1R except for the difference in reference numerals.

A wireless acoustic system 100 shown in FIG. 5 includes the earphone 1L, the earphone 1R, and the smartphone F1. The earphone 1L includes the touch sensor TCL, the wearing sensor SEL, a read only memory (ROM) 11L, a random access memory (RAM) 12L, a power monitoring unit 13L including the battery B1L, a wireless communication unit 14L, the sound signal input/output control unit S1L, an earphone control unit S2L, a valve 70L, the microphone MC1L, the microphone MC2L, and the microphone MC3L.

The touch sensor TCL as an example of the operation input unit is communicably connected to the earphone control unit S2L. The touch sensor TCL generates a signal related to a touch operation performed by a user who is a wearer, and outputs the signal to the earphone control unit S2L.

The wearing sensor SEL is connected to the earphone control unit S2L so as to enable data input and output, generates a signal relating to whether the left ear of the user is in contact with the earphone 1L, and outputs the signal to the earphone control unit S2L.

The power monitoring unit 13L is implemented using, for example, a semiconductor chip. The power monitoring unit 13L includes the battery B1L and measures a remaining charge capacity of the battery B1L. The battery B1L is a secondary battery such as a lithium ion battery. The power monitoring unit 13L outputs information related to the measured remaining charge capacity of the battery B1L to the earphone control unit S2L.

The wireless communication unit 14L is wirelessly connected to the smartphone F1 so as to enable data communication, and transmits a sound signal processed by the sound signal input/output control unit S1L or the earphone control unit S2L to the smartphone F1. The wireless communication unit 14L includes an antenna ATL and performs short-range wireless communication according to, for example, a Bluetooth (registered trademark) communication standard. The wireless communication unit 14L may be connected to a communication line such as Wi-Fi (registered trademark), a mobile communication line, or the like. The earphones 1L and 1R can individually perform wireless communication with the smartphone F1 using the wireless communication unit 14L and the wireless communication unit 14R, respectively. Therefore, each of the earphones 1L and 1R can receive data, a sound signal, or information transmitted from the smartphone F1.

The sound signal input/output control unit S1L is implemented using a processor such as a central processing unit (CPU), a micro processing unit (MPU), a digital signal processor (DSP), or a field programmable gate array (FPGA). The sound signal input/output control unit SIL is connected to the earphone control unit S2L so as to enable data input and output, and exchanges a sound signal with a digital signal converted into a digital format by a pulse code modulation (PCM) system. The sound signal input/output control unit S1L adjusts a volume level of a digital signal relating to the sound signal acquired from the smartphone F1 and outputs the digital signal to the speaker SP1L.

The sound signal input/output control unit S1L is connected to the microphone MC1L, the microphone MC2L, and the microphone MC3L, and receives, from the microphones, sound signals collected by the microphones. The sound signal input/output control unit S1L may be capable of performing a process such as amplifying the sound signal received from each microphone, and converting an analog signal into a digital signal. The sound signal input/output control unit S1L transmits data of the sound signal received from each microphone to the earphone control unit S2L.

The earphone control unit S2L as an example of the control unit is implemented using a processor such as a CPU, an MPU, a DSP, or an FPGA, is connected to the sound signal input/output control unit S1L, the ROM 11L, the RAM 12L, the power monitoring unit 13L, and the wireless communication unit 14L so as to enable data input and output, and exchanges a sound signal as a digital signal converted into a digital form by the PCM system. The earphone control unit S2L functions as a controller that controls an overall operation of the earphone 1L, and performs a control process for controlling an overall operation of each unit of the earphone 1L, and a data input/output process, a data arithmetic process, and a data storage process with each unit of the earphone 1L.

The sound signal input/output control unit S1L and the earphone control unit S2L implement respective functions by using a program and control data stored in the ROM 11L. The sound signal input/output control unit S1L and the earphone control unit S2L may use the RAM 12L during operation and temporarily store generated or acquired data or information in the RAM 12L.

The valve 70L is connected to the earphone control unit S2L so as to enable data input and output. The valve 70L operates (that is, opens and closes) based on a signal from the earphone control unit S2L. The valve 70L is controlled to be in the open state or the close state by the earphone control unit S2L based on contents set on a setting screen displayed on the smartphone F1. In the present embodiment, for example, the valve 70L is controlled based on an operation of the earphone 1L or an acoustic mode (described later) of the earphone 1L. Details of a method for controlling the valve 70L will be described later.

The smartphone F1 is a wireless terminal carried by a user.

Figure 6:
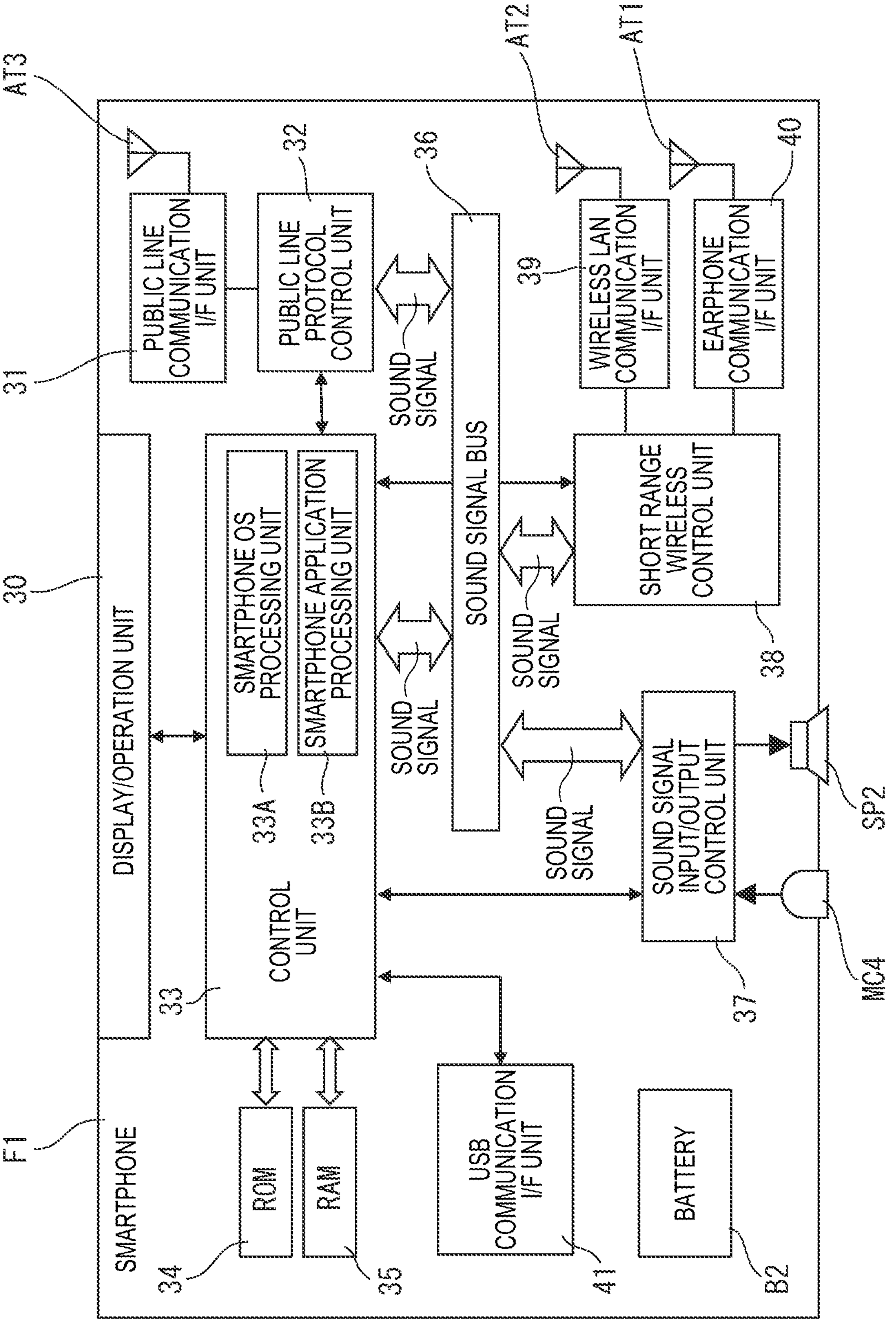
FIG. 6 is a block diagram showing a hardware configuration example of a smartphone according to the present embodiment.

Next, a hardware configuration example of the smartphone will be described with reference to FIG. 6. FIG. 6 is a block diagram showing the hardware configuration example of the smartphone according to the present embodiment. The smartphone F1 includes a display/operation unit 30, a public line communication I/F unit 31, a public line protocol control unit 32, a control unit 33, a ROM 34, a RAM 35, a sound signal bus 36, a sound signal input/output control unit 37, a short-range wireless control unit 38, a wireless LAN communication I/F unit 39, an earphone communication I/F unit 40, a USB communication I/F unit 41, and a battery B2. In FIG. 6, an interface is abbreviated as "I/F".

The display/operation unit 30 as an example of a display unit or an operation unit is implemented using a touch panel that receives an operation by the user and displays data generated by the control unit 33, and forms a so-called user interface. The display/operation unit 30 may display various screens generated by the control unit 33. The display/operation unit 30 receives an operation by the user on the displayed various screens, generates an input signal, and sends the input signal to the control unit 33.

The public line communication I/F unit 31 is connected to an antenna AT3 included in the smartphone F1 and performs wireless communication (for example, wireless communication conforming to a fourth generation mobile communication system (4G) such as a long term evolution (LTE) or a fifth generation mobile communication system (5G) with a public base station (not shown) using a public line. The public line communication I/F unit may be omitted from the configuration of the smartphone F1.

The public line protocol control unit 32 executes control relating to data input and output between the sound signal bus 36 and the public line communication I/F unit 31. The public line protocol control unit 32 may be omitted from the configuration of the smartphone F1.

The control unit 33 is implemented using a processor such as a CPU, an MPU, or a DSP. A smartphone OS processing unit 33A and a smartphone application processing unit 33B are functionally included, and the smartphone OS processing unit 33A and the smartphone application processing unit 33B perform various processes and controls in cooperation with the ROM 34.

A program that defines an operation of the control unit 33 and data used during execution of the program are written in the ROM 34. The ROM 34 stores identification information of the smartphone F1 and identification information of the earphone 1 registered in advance as a destination to which a sound signal is transmitted.

The RAM 35 is a RAM as a work memory used when each process of the control unit 33 is executed. The RAM 35 temporarily stores data or information generated or acquired by the control unit 33.

The sound signal bus 36 inputs and outputs sound signal data to and from the control unit 33, sound signal data to and from the public line protocol control unit 32, sound signal data to and from the sound signal input/output control unit 37, and sound signal data to and from the short-range wireless control unit 38.

The sound signal input/output control unit 37 transmits the sound signal data collected by a microphone MC4 to the control unit 33 via the sound signal bus 36 and outputs the sound signal received via the sound signal bus 36 from a speaker SP2 based on a command output from the control unit 33.

The microphone MC4 collects a voice based on an utterance of a user using the smartphone F1, converts the voice into a sound signal, and transmits the converted sound signal to the sound signal input/output control unit 37. The sound signal collected by the microphone MC4 is input to the control unit 33 via the sound signal input/output control unit 37 and the sound signal bus 36.

The speaker SP2 acoustically outputs the sound signal data from the sound signal input/output control unit 37.

The short-range wireless control unit 38 executes control related to data input and output between the sound signal bus 36 and the wireless LAN communication I/F unit 39 as well as between the sound signal bus 36 and the earphone communication I/F unit 40. The short-range wireless control unit 38 transmits the command output from the control unit 33 and data of a sound signal received via the sound signal bus 36 to the wireless LAN communication I/F unit 39 or the earphone communication I/F unit 40. The short-range wireless control unit 38 may transmit data of a sound signal received from the wireless LAN communication I/F unit 39 or the earphone communication I/F unit 40 to the control unit 33.

The wireless LAN communication I/F unit 39 is connected to an antenna AT2 included in the smartphone F1 and performs wireless communication (for example, data transmission from the short-range wireless control unit 38) with the earphone 1 using a wireless LAN. The wireless LAN communication I/F unit 39 is implemented using a communication circuit that can be connected to the Internet via a wireless LAN router (not shown). The wireless LAN communication I/F unit 39 may perform wireless communication (for example, wireless LAN such as Wi-Fi (registered trademark)) with the earphones 1L and 1R via the above wireless LAN router (not shown).

The earphone communication I/F unit 40 is connected to an antenna AT1 included in the smartphone F1, and performs short-range wireless communication (for example, data transmission from the short-range wireless control unit 38) with the earphone 1 according to Bluetooth (registered trademark).

The USB communication I/F unit 41 is an interface for communicating with the smartphone F1 and an external device (for example, a personal computer (PC)) via a cable or the like. The USB communication I/F unit 41 is connected to the control unit 33 to enable data communication, and can transmit data from the external device to the control unit 33. The USB communication I/F unit 41 may supply electric charge from an external commercial power supply to the battery B2.

The battery B2 is a secondary battery (for example, a lithium ion battery) capable of accumulating the electric charge supplied from the external commercial power supply, and supplies necessary power to each unit of the smartphone F1. The battery B2 may be implemented to be detachable from a housing of the smartphone F1. The battery B2 may directly supply power from the external commercial power supply, and may supply power to the smartphone F1 in a state of being disconnected from the external commercial power supply.

Next, various types of operation examples for controlling opening and closing of a valve according to the operations or the acoustic modes of the earphones 1L and 1R will be described. In the present embodiment, for example, three types of operation examples will be described.

First Operation Example

Figure 7:
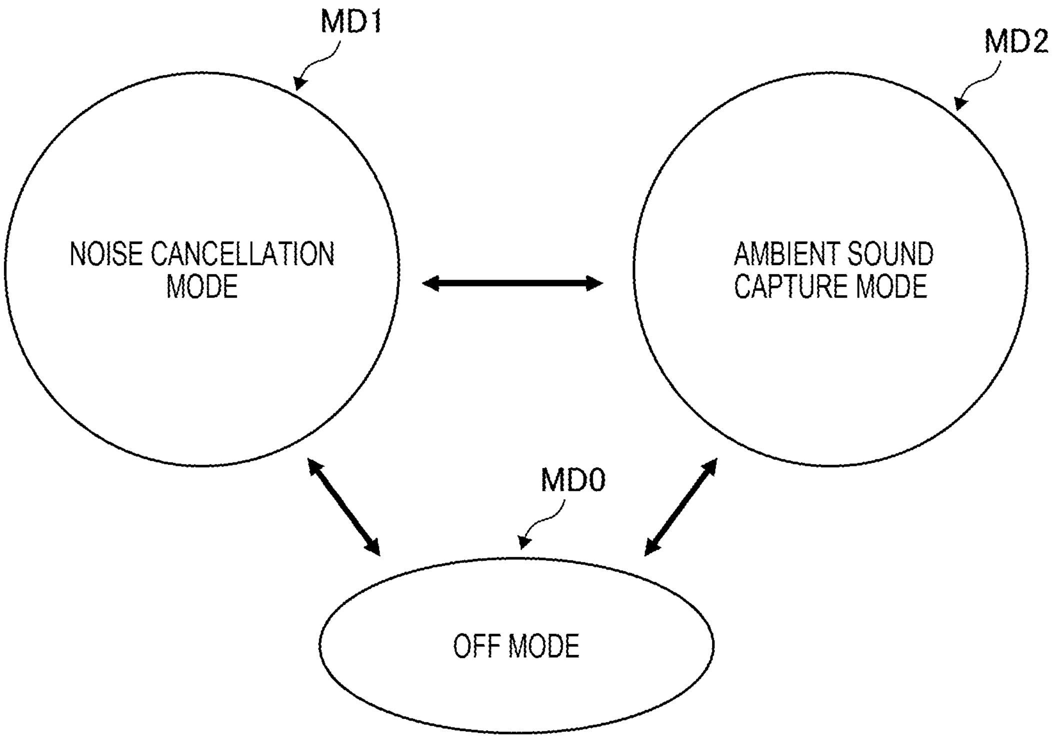
FIG. 7 shows a state transition example of acoustic modes of an earphone according to a first operation example.
Figure 9:
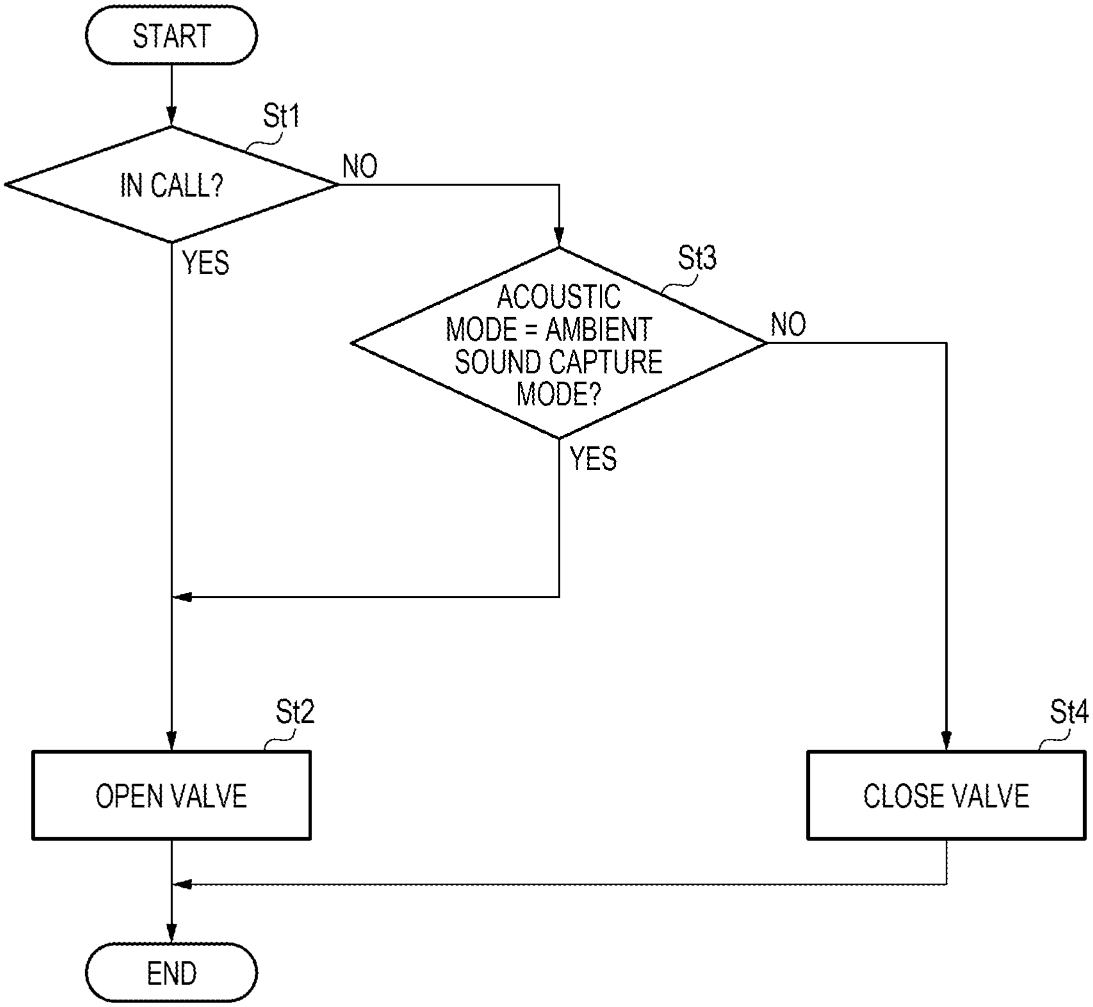
FIG. 9 is a flowchart showing an operation procedure example of the earphone according to the first operation example in time series.

FIG. 7 is a diagram showing a state transition example of acoustic modes of an earphone according to a first operation example. FIG. 8 is a diagram showing a correspondence table showing a relation example between the acoustic modes and operations of the earphone according to the first operation example. FIG. 9 is a flowchart showing an operation procedure example of the earphone according to the first operation example in time series. The flowchart in FIG. 9 is executed by the earphone control units S2L and S2R when the states of the earphones 1L and 1R (for example, the operations or the acoustic modes of the earphones 1L and 1R) are changed.

The first operation example is the most basic form of the three types of operation examples, and for example, when the user is in a call or participating in a remote conference (online conference), each of the valves 70L and 70R is switched to the open state regardless of the acoustic mode, and in a case of music playback where the user is listening to music, the states of the valves 70L and 70R are switched to be different depending on the acoustic modes.

Here, the acoustic mode of the earphone is an operation mode for designating acoustic characteristics of a sound signal (for example, a music signal) that is acoustically output from the earphones 1L and 1R, and for example, there are a noise cancellation mode MD1, an ambient sound capture mode MD2, and an OFF mode MD0.

The noise cancellation mode MD1 is an operation mode for executing a known noise cancellation process. In the noise cancellation process, for example, an opposite phase signal of an ambient noise component is generated using a sound signal collected by each of the earphone 1L (specifically, the microphones MC1L and MC3L) and the earphone 1R (specifically, the microphones MC1R and MC3R), and the opposite phase signal is synthesized with a sound signal as a target to be acoustically output, whereby the ambient noise component can be further prevented or removed.

The ambient sound capture mode MD2 is an operation mode in which ambient ambient sounds of the earphones 1L and 1R are actively collected and captured. In the ambient sound capture mode, sound signals of ambient sounds collected by the microphone MC1L of the earphone 1L and the microphone MC1R of the earphone 1R are input to the earphone control units S2L and S2R, respectively.

The OFF mode MD0 is a so-called normal operation mode, and neither a noise cancellation process nor an ambient sound capture process is performed.

The noise cancellation mode MD1, the ambient sound capture mode MD2, and the OFF mode MD0 can be easily switched to one another by a predetermined user operation. The predetermined user operation may be, for example, a long press operation for the touch sensors TCL and TCR of the respective earphones 1L and 1R, or an operation for designating an acoustic mode from a dedicated application (not shown) installed in the smartphone F1. Accordingly, the acoustic modes of the earphones 1L and 1R can be changed by a simple operation of the user.

A correspondence table TBL1 shown in FIG. 8 defines, in the first operation example, states of the valves 70L and 70R in accordance with respective playback states (specifically, during music playback or in a call) and the acoustic modes (specifically, the noise cancellation mode MD1, the ambient sound capture mode MD2, and the OFF mode MD0) of the earphones 1L and 1R. The states of the valves 70L and 70R are the open state and the close state.

As described above, in the first operation example, when the user is in a call (for example, while the microphones MC2L and MC2R are collecting the uttered voice of the user, or while the user is not uttering but listening to the voice uttered by another person who is the other party of the call), the earphone control units S2L and S2R switch the valves 70L and 70R to the open state regardless of the acoustic modes, respectively. That is, the valves 70L and 70R are keptin the open state in the noise cancellation mode MID1, the ambient sound capture mode MD2, or the OFF mode MD0. Accordingly, when the user is in a call, both the valves 70L and 70R are kept in the open state, and thus the paths 71 in the respective housings HOL and HOR communicate with the outside air, whereby a user is prevented from feeling that the voice uttered by himself/herself is muffled even while the earphones 1L and 1R are being worn.

On the other hand, while the user is playing music (that is, when music signals are acoustically output from the speakers SP1L and SP1R), the earphone control units S2L and S2R switch the valves 70L and 70R to the close state, respectively, if the acoustic mode is the noise cancellation mode MD1 or the OFF mode MD0. When the acoustic mode is the ambient sound capture mode MD2, the earphone control units S2L and S2R switch the valves 70L and 70R to the open state, respectively. Accordingly, for example, when the user wants to listen to music in a concentrated manner, the user can switch the mode to the noise cancellation mode MD1 or the OFF mode MD0 to bring the valves 70L and 70R into the close state, whereby deterioration of a sound quality of music can be prevented and the user can comfortably enjoy music listening. In addition, even when the user is not in a call (for example, during music playback), the user can listen to the ambient sound by switching the mode to the ambient sound capture mode MD2 to bring the valves 70L and 70R into the open state, thereby improving convenience. Accordingly, when the user is talked to by another person while listening to music, the user can hear the voice of that person well, and furthermore, it is possible to prevent the user from feeling that the voice uttered by the user is muffled when the user is uttering.

In FIG. 9, the earphone control units S2L and S2R of the respective earphones 1L and 1R determine whether a user is in a call at present based on, for example, whether the sound pressure levels of the voice signals collected by the respective microphones MC2L and MC2R or the sound pressure level of the voice signal corresponding to the voice uttered by another person who is the other party of the call exceeds a threshold of a predetermined sound pressure level when it is assumed to be in a call, or whether to be connected in a hands-free profile of Bluetooth (registered trademark) (step St1). When it is determined that the user is in a call at present (YES in step St1), the earphone control units S2L and S2R bring the respective valves 70L and 70R into the open state to open the respective paths 71 so as to communicate with the outside air (step St2). Accordingly, when the user is in a call, the path 71 communicates with the outside air, whereby it is possible to prevent the user from feeling uncomfortable that the voice uttered by himself/herself is muffled in the ear, and it is possible to comfortably make a call.

When it is determined that the user is not in a call at present (NO in step St1), the earphone control units S2L and S2R refer to, for example, the respective RAMs 12L and 12R to determine whether the current acoustic mode is the ambient sound capture mode MD2 (step St3). The case where the user is not in a call corresponds to, for example, a case where the user playing music transferred from the smartphone F1 on the earphones 1L and 1R.

When it is determined that the current acoustic mode is the ambient sound capture mode MD2 (YES in step St3), the earphone control units S2L and S2R bring the respective valves 70L and 70R to the open state, respectively, to open the respective paths 71 so as to communicate with the outside air (step St2). Accordingly, even when the user is not in a call, the ambient sound is collected by the microphones MC1L and MC1R during the ambient sound capture mode MD2 and is acoustically output from the speakers SP1L and SP1R so that the user can hear the sound, and thus even when the user is listening to music, the user not only can be talked to, but also can easily grasp what is occurring around the user by the path 71 communicating with the outside air.

When it is determined that the current acoustic mode is not the ambient sound capture mode MD2 (NO in step St3), the earphone control units S2L and S2R bring the respective valves 70L and 70R to the close state to block (close) the respective paths 71 from the outside air (step St4). Accordingly, when the user is not in a call or when the acoustic mode is not the ambient sound capture mode MD2 (for example, when the user is playing music transferred from the smartphone F1), the user can concentrate on the music without paying attention to the ambient sound.

Second Operation Example

Figure 10:
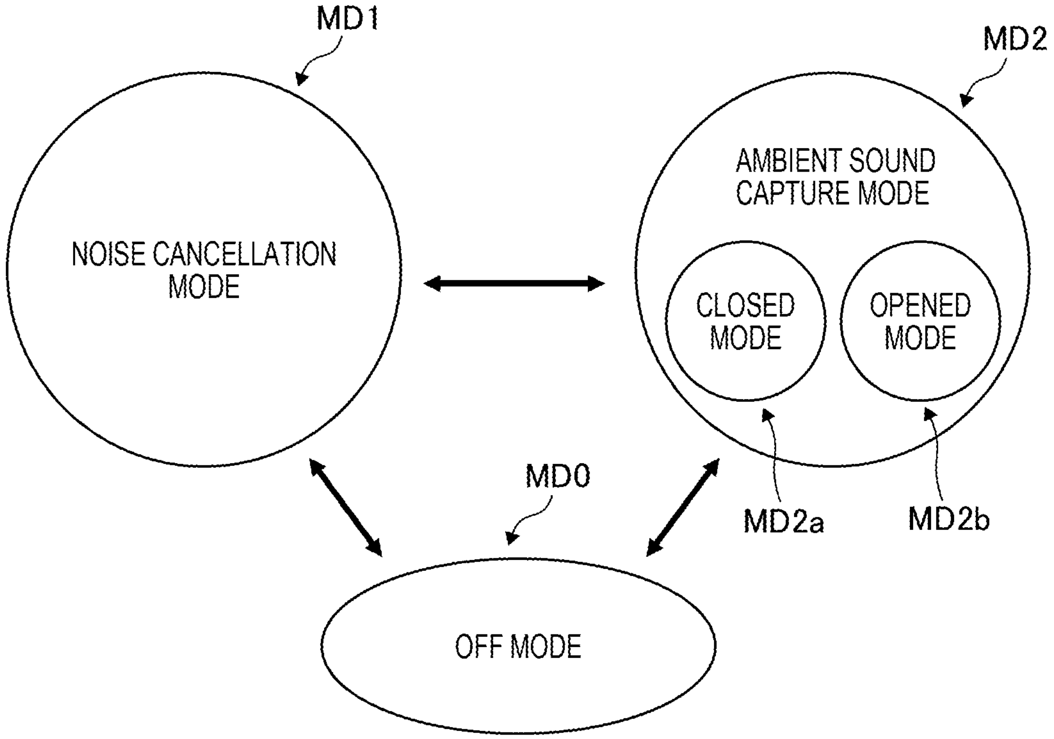
FIG. 10 shows a state transition example of acoustic modes of an earphone according to a second operation example.
Figure 12:
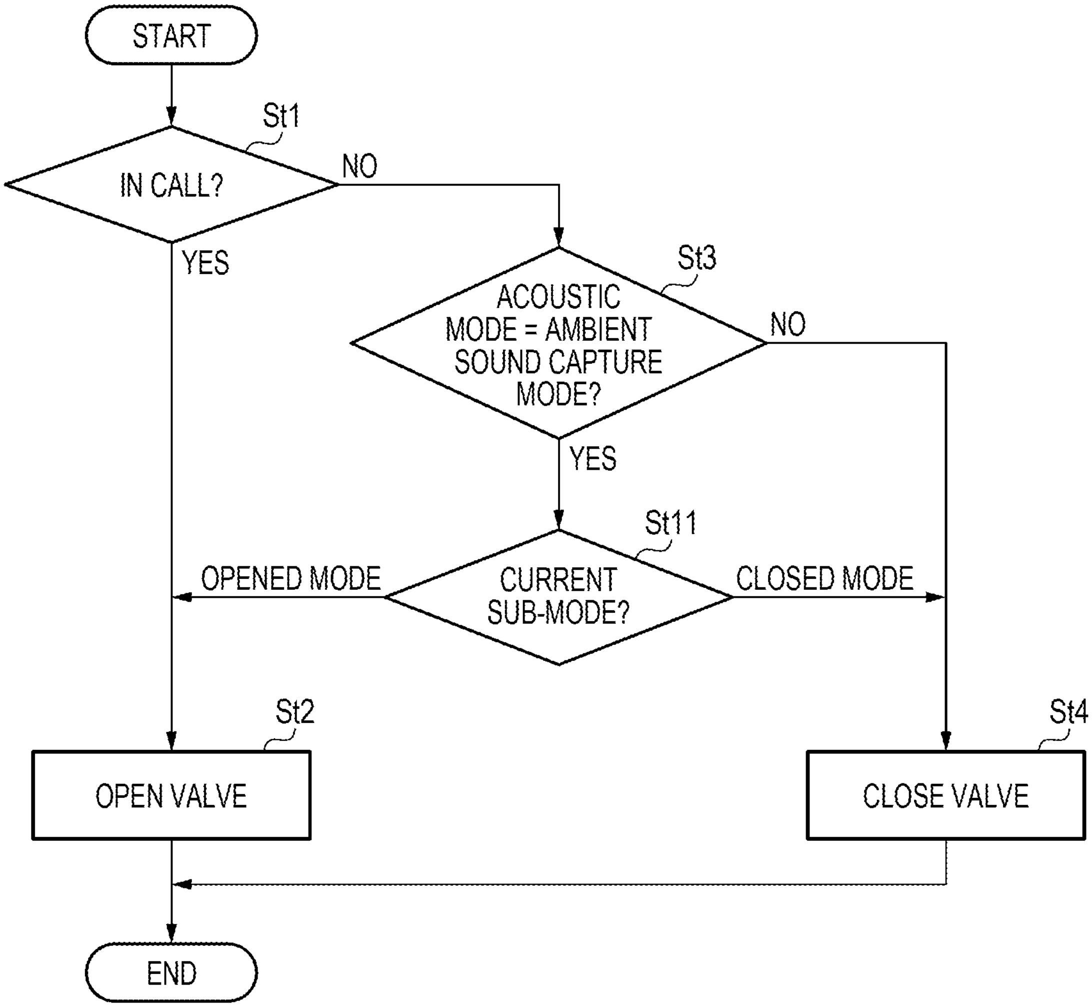
FIG. 12 is a flowchart showing an operation procedure example of the earphone according to the second operation example in time series.

FIG. 10 shows a state transition example of acoustic modes of an earphone according to a second operation example. FIG. 11 is a diagram showing a correspondence table showing a relation example between the acoustic modes and operations of the earphone according to the second operation example. FIG. 12 is a flowchart showing an operation procedure example of the earphone according to the second operation example in time series. In the description of FIG. 10 or FIG. 12, the same elements as those in the description of FIG. 7 or FIG. 9 are denoted by the same reference numerals, the description thereof will be simplified or omitted, and different contents will be described. Similar to FIG. 9, the flowchart in FIG. 12 is executed by the earphone control units S2L and S2R when the states of the respective earphones 1L and 1R (for example, the operations or the acoustic modes of the earphones 1L and 1R) are changed.

The second operation example is a development form of the first operation example, and for example, when the user is in a call or participating in a remote conference (online conference), each of the valves 70L and 70R is switched to the open state regardless of the acoustic mode similar to the first operation example, and in a case of music playback where the user is listening to music, the states of the valves 70L and 70R are switched to be different depending on a closed mode or an opened mode of the ambient sound capture mode.

In the second operation example, the ambient sound capture mode MD2 includes a closed mode MD2*a* and an opened mode MD2*b* as sub-modes. The opened mode MD2*b* of the ambient sound capture mode MD2 is an operation mode in which ambient sounds around the earphones 1L and 1R are actively collected and captured similar to the ambient sound capture mode MD2 according to the first operation example. The opened mode MD2*b* is used, for example, when it is desired to actively listen to the utterance of another person uttering around. On the other hand, the closed mode MD2*a* of the ambient sound capture mode MD2 is used when it is not required to actively capture the ambient sound but capturing an ambient sound intends to assist the operation of the user. For example, in a case where the user is not making a call and wants to listen to an ambient sound such as a case where the user is walking or wants to listen to an announcement of a train, it is expected that the sound quality of music that is acoustically output from the earphones 1L and 1R is improved by setting the closed mode.

A correspondence table TBL2 shown in FIG. 11 defines, in the second operation example, the states of the valves 70L and 70R corresponding to the playback states (specifically, during music playback and in a call) and the acoustic modes (specifically, the noise cancellation mode MID1, the closed mode MD2*a* of the ambient sound capture mode MD2, the opened mode MD2*b* of the ambient sound capture mode MD2, and the OFF mode MD0) of the respective earphones 1L and 1R. The states of the valves 70L and 70R are the open state and the close state.

In the second operation example, when the user is in a call (for example, while the microphones MC2L and MC2R are collecting the uttered voice of the user, or while the user is not uttering but listening to the voice uttered by another person who is the other party of the call), the earphone control units S2L and S2R switch the respective valves 70L and 70R to the open state regardless of the acoustic mode, similar to the first operation example. That is, the valves 70L and 70R are kept in the open state in the noise cancellation mode MD1, the closed mode MD2*a* of the ambient sound capture mode MD2, the opened mode MD2*b* of the ambient sound capture mode MD2, or the OFF mode MD0. Accordingly, when the user is in a call, both the valves 70L and 70R are kept in the open state, and thus the paths 71 in the respective housings HOL and HOR communicate with the outside air, whereby a user is prevented from feeling that the voice uttered by himself/herself is muffled even while the earphones 1L and 1R are being worn.

On the other hand, while the user is playing music (that is, when music signals are acoustically output from the speakers SP1L and SP1R), the earphone control units S2L and S2R switch the respective valves 70L and 70R to the close state when the acoustic mode is the noise cancellation mode MD1, the OFF mode MD0, and the closed mode MD2*a* of the ambient sound capture mode MD2. When the acoustic mode is the opened mode MD2*b* of the ambient sound capture mode MD2, the earphone control units S2L and S2R switch the respective valves 70L and 70R to the open state. Accordingly, for example, when the user wants to listen to music in a concentrated manner or when the user wants to listen to an ambient sound even during music playback, the operation mode is switched to the noise cancellation mode MID1, the closed mode MD2*a* of the ambient sound capture mode MD2, or the OFF mode MD0 to bring the valves 70L and 70R into the close state, whereby the sound quality of music can be improved and the user can comfortably enjoy music listening. In addition, even when the user is not in a call (for example, during music playback), the user can listen to the ambient sound by switching to the opened mode MD2*b* of the ambient sound capture mode MD2 to bring the valves 70L and 70R to the open state, thereby improving convenience. Accordingly, when the user is talked to by another person while listening to music, the user can hear the voice of that person well, and furthermore, it is possible to prevent the user from feeling that the voice uttered by the user is muffled when the user is uttering.

In FIG. 12, when it is determined that the current acoustic mode is the ambient sound capture mode MD2 (YES in step St3), the earphone control units S2L and S2R determine whether the current sub-mode is the closed mode MD2*a* or the opened mode MD2*b* (step St11). When it is determined that the current sub-mode is the opened mode MD2*b* (opened mode in step St11), the earphone control units S2L and S2R bring the respective valves 70L and 70R to the open state to open the respective paths 71 so as to communicate with the outside air (step St2). Accordingly, even when the user is not in a call, the ambient sound is collected by the microphones MC1L and MC1R in the opened mode MD2*b* of the ambient sound capture mode MD2 and is acoustically output from the respective speakers SP1L and SP1R so that the user can hear the sound, and thus even when the user is listening to music, this not only makes it easy for the user to actively listen to the voice of a person around the user, but also makes it easy for the user to grasp what is occurring around the user by the respective paths 71 communicating with the outside air.

When it is determined that the current sub-mode is the closed mode MD2*a* (closed mode in step St11), the earphone control units S2L and S2R bring the respective valves 70L and 70R to the close state to block (close) the respective paths 71 from the outside air (step St4). Accordingly, it is possible not only to listen when the user wants to listen to any ambient sound if not uttering because the user is not in a call but also to improve the sound quality of the music being played and to comfortably enjoy the music.

Third Operation Example

Figure 13:
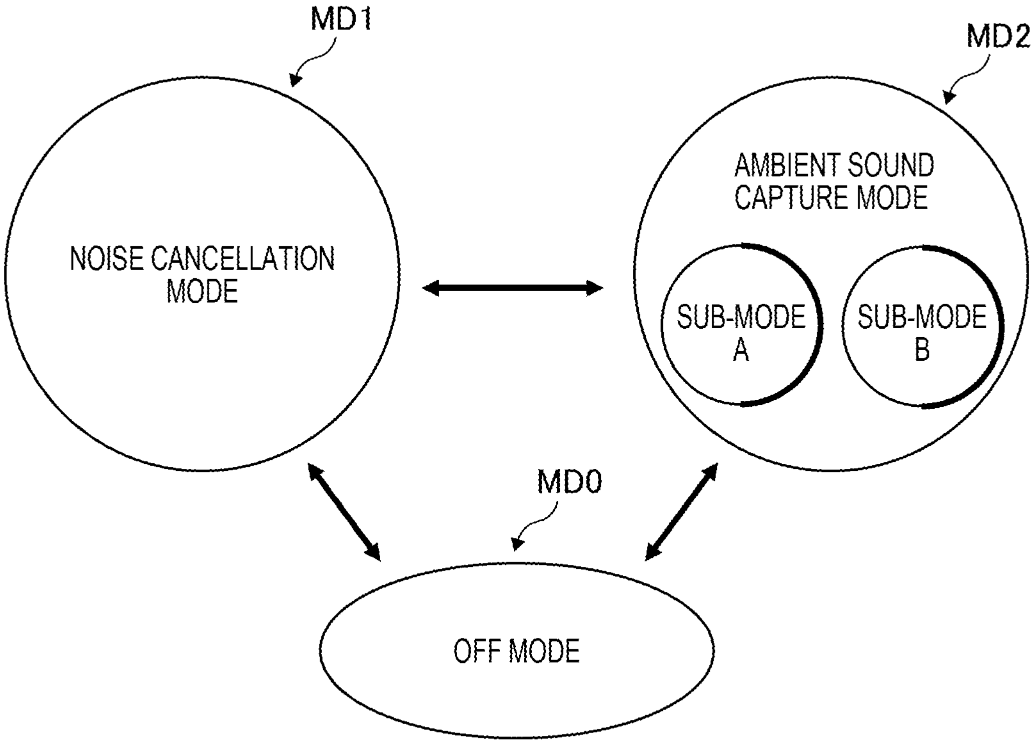
FIG. 13 shows a state transition example of acoustic modes of an earphone according to a third operation example.
Figure 14:
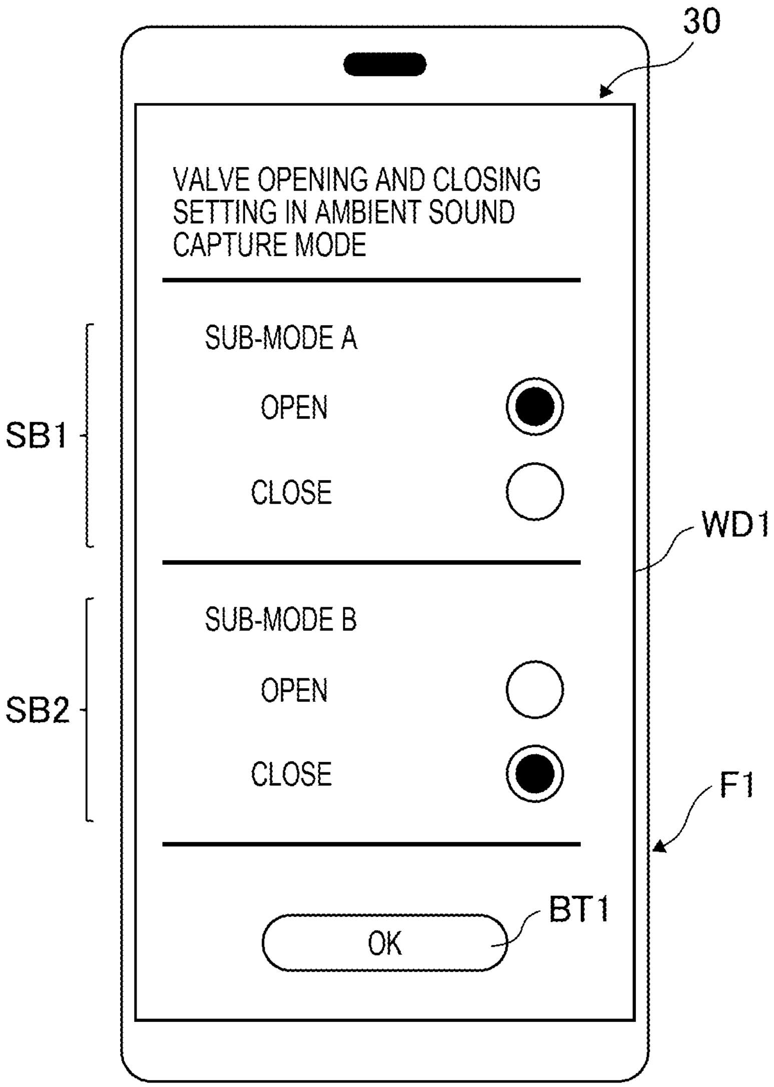
FIG. 14 is a diagram showing a setting screen example for opening and closing a valve in an ambient sound capture mode.
Figure 16:
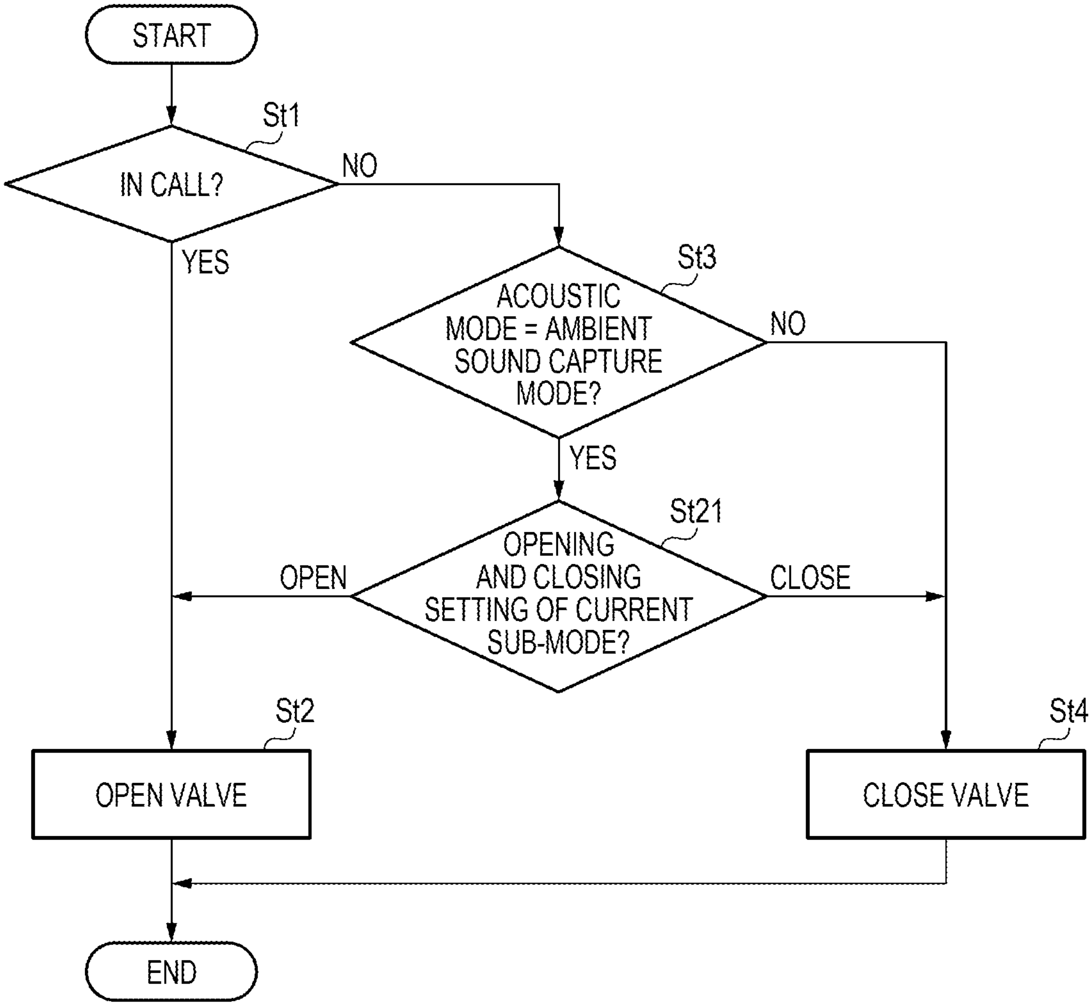
FIG. 16 is a flowchart showing an operation procedure example of the earphone according to the third operation example in time series.

FIG. 13 shows a state transition example of acoustic modes of an earphone according to a third operation example. FIG. 14 is a diagram showing a setting screen example for opening and closing a valve in an ambient sound capture mode. FIG. 15 is a diagram showing a correspondence table showing a relation example between the acoustic modes and operations of the earphone according to the third operation example. FIG. 16 is a flowchart showing an operation procedure example of the earphone according to the third operation example in time series. In the description of FIG. 13 or FIG. 16, the same elements as those in the description of FIG. 10 or FIG. 12 are denoted by the same reference numerals, the description thereof will be simplified or omitted, and different contents will be described. Similar to FIG. 9 or FIG. 12, the flowchart in FIG. 16 is executed by the earphone control units S2L and S2R when the states of the respective earphones 1L and 1R (for example, the operations or the acoustic modes of the earphones 1L and 1R) are changed.

The third operation example is a development form of the first operation example, and for example, when the user is in a call or participating in a remote conference (online conference), the valves 70L and 70R are switched to the open state regardless of the acoustic modes similar to the first operation example, and in the ambient sound capture mode, the user individually sets two sub-modes based on his/her preference, and the opened/closed states of the valves 70L and 70R are switched to be different in the respective sub-modes.

The ambient sound capture mode MD2 in the third operation example includes two sub-modes A and B that can be freely determined by the user as the sub-modes. The sub-mode A of the ambient sound capture mode MD2 is, for example, an operation mode in which sound signals in all the frequency bands are captured, and the same applies to the following description. The sub-mode B of the ambient sound capture mode MD2 is, for example, an operation mode in which a sound signal of a frequency band (for example, a 100 Hz to 1,000 Hz band of human voice) is captured, and the same applies to the following description. The contents of the sub-modes A and B are not limited thereto, and may be freely selected or specified by, for example, a user operation on a dedicated application installed in the smartphone F1. According to the sub-mode A, the earphones 1L and 1R are capable of capturing not only human voice but also sound generated in the surroundings without omission. On the other hand, according to the sub-mode B, the earphones 1L and 1R are capable of capturing only human voice generated in the surroundings.

A setting screen WD1 shown in FIG. 14 is displayed on the display/operation unit 30 among dedicated applications installed in the smartphone F1, for example, by a user operation. In the third operation example, it is possible to set on this setting screen whether it is necessary to open and close the valves 70L and 70R in the ambient sound capture mode MD2 during an operation in which the user is not in a call. The setting screen WD1 includes a setting region SB1 for the sub-mode A and a setting region SB2 for the sub-mode B. In FIG. 14, for example, "open" (that is, open state) of the valves 70L and 70R is designated in the sub-mode A, and "close" (that is, close state) of the valves 70L and 70R is designated in the sub-mode B. When an OK icon BT1 is pressed by the user operation after the designation, the smartphone F1 shares, with the earphones 1L and 1R, open/close setting of the valves 70L and 70R in the sub-modes A and B corresponding to the pressing of the OK icon BT1. Accordingly, in the third operation example, the earphones 1L and 1R can easily control the opening and closing of the respective valves 70L and 70R based on the setting shared from the smartphone F1 in the ambient sound capture mode MD2 during an operation (for example, during music playback) in which the user is not in a call.

A correspondence table TBL3 shown in FIG. 15 defines, in the third operation example, the states of the valves 70L and 70R corresponding to the playback states (specifically, during music playback and in a call) and the acoustic modes (specifically, the noise cancellation mode MID1, the sub-mode A of the ambient sound capture mode MD2, the sub-mode B of the ambient sound capture mode MD2, and the OFF mode MD0) of the respective earphones 1L and 1R. The states of the valves 70L and 70R are the open state and the close state.

In the third operation example, when the user is in a call (for example, while the microphones MC2L and MC2R are collecting the uttered voice of the user, or while the user is not uttering but listening to the voice uttered by another person who is the other party of the call), the earphone control units S2L and S2R switch the respective valves 70L and 70R to the open state regardless of the acoustic modes, respectively, similar to the first operation example and the second operation example. That is, the valves 70L and 70R are kept in the open state in the noise cancellation mode MD1, the sub-mode A of the ambient sound capture mode MD2, the sub-mode B of the ambient sound capture mode MD2, or the OFF mode MD0. Accordingly, when the user is in a call, both the valves 70L and 70R are kept in the open state, and thus the paths 71 in the respective housings HOL and HOR communicate with the outside air, whereby a user is prevented from feeling that the voice uttered by himself/herself is muffled even while the earphones 1L and 1R are being worn.

On the other hand, while the user is playing music (that is, when music signals are acoustically output from the speakers SP1L and SP1R), the earphone control units S2L and S2R switch the respective valves 70L and 70R to the close state if the acoustic mode is the noise cancellation mode MD1, the OFF mode MD0, and the setting "CLOSE" of the sub-modes A and B of the ambient sound capture mode MD2. The earphone control units S2L and S2R switch the respective valves 70L and 70R to the open state if the acoustic mode is "OPEN" of the sub-modes A and B of the ambient sound capture mode MD2. Accordingly, for example, in a case where the user wants to listen to the ambient sound of a frequency band (sub-modes A and B) desired to be captured in accordance with the way of use of the user, the user can listen to the ambient sound by bringing the valves 70L and 70R into the open state, thereby improving convenience. In addition, for example, when the user wants to listen to music in a concentrated manner by blocking ambient sounds of a frequency (sub-modes A and B) desired to be captured in accordance with the way of use, the user can comfortably enjoy music listening by bringing the valves 70L and 70R into the close state.

In FIG. 16, when it is determined that the current acoustic mode is the ambient sound capture mode MD2 (YES in step St3), the earphone control units S2L and S2R determine whether the current setting of the sub-mode A or the sub-mode B is "CLOSE" or "OPEN" (step St21). When it is determined that the current setting of the sub-mode A or the sub-mode B is "OPEN" (OPEN in step St21), the earphone control units S2L and S2R bring the respective valves 70L and 70R to the open state to open the respective paths 71 so as to communicate with the outside air (step St2). Accordingly, even when the user is not in a call, the ambient sound is collected by the microphones MC1L and MC1R during the sub-mode A or the sub-mode B of the ambient sound capture mode MD2 and is acoustically output from the respective speakers SP1L and SP1R so that the user can hear the sound, and thus even when the user is listening to music, this not only makes it easy for the user to actively listen to the voice of a person around the user, but also makes it easy for the user to grasp what is occurring around the user by the respective paths 71 communicating with the outside air.

When it is determined that the current setting of the sub-mode A or the sub-mode B is "CLOSE" (CLOSE in step St21), the earphone control units S2L and S2R bring the respective valves 70L and 70R to the close state to block (close) the respective paths 71 from the outside air (step St4). Accordingly, it is possible not only to listen when the user wants to listen to any ambient sound in the sub-mode A or the sub-mode B of the ambient sound capture mode MD2 if not uttering because the user is not in a call but also to improve the sound quality of the music being played and to comfortably enjoy the music.

As described above, the earphone 1L, 1R according to the present embodiment includes the housing HOL, HOR having a space therein and having a path capable of ventilation from one end side on an external auditory canal side of a wearer (user) to the other end side on an ambient environment side (outside air side); the valve 70L, 70R accommodated in the housing HOL, HOR and configured to switch the path 71 between an open state and a close state; the microphone MC2L, MC2R disposed on one end side of the housing HOL, HOR and configured to collect an uttered voice of the wearer; and the control unit (for example, the earphone control unit S2L, S2R) configured to control the open state and the close state. The control unit switches the path 71 to the open state during a first operation in a call including an operation in which an uttered voice of the wearer is collected by the microphone MC2L, MC2R, and switches the path 71 either the open state or the close state during a second operation (for example, during music playback) different from the first operation. Accordingly, the earphone 1L, 1R can adaptively adjust the ease of listening to a sound in accordance with a usage situation of a wearer (for example, during a first operation or a second operation), and can prevent the wearer from feeling uncomfortable.

The control unit (for example, the earphone control unit S2L, S2R) can control the acoustic mode of the earphone 1L, 1R, switches the path 71 to the close state during the second operation when the acoustic mode is a noise cancellation mode, and switches the path 71 to the open state during the second operation when the acoustic mode is an ambient sound capture mode. Accordingly, the earphone 1L, 1R brings the valve 70L, 70R to the close state in a case of the noise cancellation mode MD1 in which a user can reduce a noise component included in an ambient sound, whereby it is possible to easily provide an environment in which the user can concentrate to music. The earphone 1L, 1R brings the valve 70L, 70R to the open state in a case of the ambient sound capture mode MD2 in which the user wants to capture an ambient sound, whereby it is possible to easily provide an environment in which the user can easily notice the surroundings.

The control unit (for example, the earphone control unit S2L, S2R) can switch the path 71 to the close state during the second operation when the acoustic mode is neither the noise cancellation mode nor the ambient sound capture mode. Accordingly, similar to an earphone in the related art, the earphone 1L, 1R brings the valve 70L, 70R to the close state when the acoustic mode is the OFF mode MD0, whereby it is possible to easily provide an environment in which the user can concentrate to music.

The control unit (for example, the earphone control unit S2L, S2R) can control the acoustic mode of the earphone, switches the path 71 to the close state during the second operation when the acoustic mode is the closed mode MD2*a* of the ambient sound capture mode MD2, and switches the path 71 to the open state during the second operation when the acoustic mode is the opened mode MD2*b* of the ambient sound capture mode MD2. Accordingly, for example, when the user wants to listen to music in a concentrated manner or when the user wants to listen to an ambient sound even during music playback, the operation mode is switched to the noise cancellation mode MD1, the closed mode MD2*a* of the ambient sound capture mode MD2, or the OFF mode MD0 to bring the valves 70L and 70R into the close state, whereby the sound quality of music can be improved and the user can comfortably enjoy music listening. In addition, even when the user is not in a call (for example, during music playback), the user can listen to the ambient sound by switching to the opened mode MD2*b* of the ambient sound capture mode MD2 to bring the valves 70L and 70R to the open state, thereby improving convenience.

The control unit (for example, the earphone control unit S2L, S2R) switches the path 71 to the close state during the second operation when the acoustic mode is the noise cancellation mode MID1, and switches the path 71 to the close state during the second operation when the acoustic mode is neither the noise cancellation mode MD1 nor the ambient sound capture mode MD2. Accordingly, the user can enjoy and listen to music with high sound quality in a concentrated manner while playing music in the noise cancellation mode MD1. Accordingly, similar to an earphone in the related art, the valve 70L, 70R are brought into the close state when the acoustic mode is neither the noise cancellation mode MD1 nor the ambient sound capture mode MD2, whereby it is possible for the user to easily obtain an environment in which the user can concentrate to music.

The control unit (for example, the earphone control unit S2L, S2R) can control the acoustic mode of the earphone 1L, 1R, switches the path 71 to the close state during the second operation based on designation by the wearer when the acoustic mode is a first sub-mode (for example, the sub-mode A) of the ambient sound capture mode MD2, switches the path 71 to the open state during the second operation based on designation by the wearer when the acoustic mode is the first sub-mode of the ambient sound capture mode MD2, switch the path 71 to the close state during the second operation based on designation by the wearer when the acoustic mode is a second sub-mode (for example, the sub-mode B) of the ambient sound capture mode MD2, and switches the path 71 to the open state during the second operation based on designation by the wearer when the acoustic mode is the second sub-mode of the ambient sound capture mode MD2. Accordingly, for example, in a case where the user wants to listen to the ambient sound of a frequency band (sub-modes A and B) desired to be captured in accordance with the way of use of the user, the user can listen to the ambient sound by bringing the valves 70L and 70R into the open state, thereby improving convenience. In addition, for example, when the user wants to listen to music in a concentrated manner by blocking ambient sounds of a frequency (sub-modes A and B) desired to be captured in accordance with the way of use, the user can comfortably enjoy music listening by bringing the valves 70L and 70R into the close state.

The control unit (for example, the earphone control unit S2L, S2R) switches the path 71 to the close state during the second operation when the acoustic mode is the noise cancellation mode MID1, and switches the path 71 to the close state during the second operation when the acoustic mode is neither the noise cancellation mode MD1 nor the ambient sound capture mode MD2. Accordingly, the user can enjoy and listen to music with high sound quality in a concentrated manner while playing music in the noise cancellation mode MD1. Accordingly, similar to an earphone in the related art, the valve 70L, 70R are brought into the close state when the acoustic mode is neither the noise cancellation mode MD1 nor the ambient sound capture mode MD2, whereby it is possible for the user to easily obtain an environment in which the user can concentrate to music.

The earphone 1L, 1R further includes the touch sensor TCL, TCR arranged on one end side of the housing HOL, HOR and configured to detect a touch operation by the wearer. The control unit (for example, the earphone control unit S2L, S2R) detects a change in the acoustic mode based on detection of a touch operation on the touch sensor TCL, TCR. Accordingly, the user can easily change the acoustic mode by performing a simple touch operation on the touch sensor TCL, TCR having a flat shape and a large area with respect to the housing HOL, HOR even when wearing the earphone 1L, 1R.

The earphone 1L, 1R further includes a communication unit (for example, the wireless communication unit 14L connected to the antenna ATL, the wireless communication unit 14R connected to the antenna ATR) that performs data communication with an external terminal (for example, the smartphone F1). The control unit (for example, the earphone control unit S2L, S2R) detects a change in the acoustic mode based on acquisition of a mode change instruction from an external terminal from the communication unit. Accordingly, the user can easily change the acoustic mode by a simple operation on the smartphone F1 held by a hand without a touch operation on the earphones 1L and 1R.

Although the embodiment has been described above with reference to the accompanying drawings, the present disclosure is not limited to such an example. It is obvious to those skilled in the art that various changes, modifications, replacements, additions, deletions, and equivalents can be conceived within the scope described in the claims, and it is understood that these also belong to the technical scope of the present disclosure. In addition, the constituent elements in the above embodiment may be freely combined without departing from the spirit of the invention.

INDUSTRIAL APPLICABILITY

The present disclosure is useful as an earphone, an acoustic control method, and a program for adaptively adjusting the ease of listening to a sound in accordance with a usage situation of a wearer, and preventing the wearer from feeling uncomfortable.

What is claimed is:

1. An earphone comprising:

a housing having a space therein and having a path capable of ventilation from one end side on an external auditory canal side of a wearer to another end side on an ambient environment side;

a valve accommodated in the housing and configured to switch the path between an open state and a close state;

a microphone disposed on one end side of the housing and configured to collect uttered voice of the wearer; and a control unit configured to control the open state and the close state, wherein the control unit is configured to control an acoustic mode of the earphone, switch the path to the open state, regardless of the acoustic mode, during a first operation in a call including an operation in which the uttered voice of the wearer is collected by the microphone, and switch the path either the open state or the close state based on the acoustic mode during a second operation different from the first operation.

2. The earphone according to claim 1, wherein in a case that the acoustic mode is a noise cancellation mode, the control unit switches the path to the close state during the second operation, and in a case that the acoustic mode is an ambient sound capture mode, the control unit switches the path to the open state during the second operation.

3. The earphone according to claim 2, wherein in a case that the acoustic mode is neither the noise cancellation mode nor the ambient sound capture mode, the control unit switches the path to the close state during the second operation.

4. The earphone according to claim 2, further comprising:

a touch sensor disposed on one end side of the housing and configured to detect a touch operation by the wearer, wherein the control unit detects a change in the acoustic mode based on detection of the touch operation on the touch sensor.

5. The earphone according to claim 2, further comprising:

a communication unit configured to perform data communication with an external terminal, wherein the control unit detects a change in the acoustic mode based on acquisition of a mode change instruction from the external terminal from the communication unit.

6. The earphone according to claim 1, wherein in a case that the acoustic mode is a closed mode of an ambient sound capture mode, the control unit switches the path to the close state during the second operation, and in a case that the acoustic mode is an opened mode of the ambient sound capture mode, the control unit switches the path to the open state during the second operation.

7. The earphone according to claim 6, wherein in a case that the acoustic mode is a noise cancellation mode, the control unit switches the path to the close state during the second operation, and in a case that the acoustic mode is neither the noise cancellation mode nor the ambient sound capture mode, the control unit switches the path to the close state during the second operation.

8. The earphone according to claim 7, wherein in a case that the acoustic mode is a noise cancellation mode, the control unit switches the path to the close state during the second operation, and in a case that the acoustic mode is neither the noise cancellation mode nor the ambient sound capture mode, the control unit switches the path to the close state during the second operation.

9. The earphone according to claim 1, wherein the control unit is configured to switch the path to the close state during the second operation based on designation by the wearer when the acoustic mode is a first sub-mode of an ambient sound capture mode, switch the path to the open state during the second operation based on designation by the wearer when the acoustic mode is the first sub-mode of the ambient sound capture mode, switch the path to the close state during the second operation based on designation by the wearer when the acoustic mode is a second sub-mode of the ambient sound capture mode, and switch the path to the open state during the second operation based on designation by the wearer when the acoustic mode is the second sub-mode of the ambient sound capture mode.

10. The earphone according to claim 1, wherein the acoustic mode is selected from a plurality of modes including a noise cancelation mode, an ambient sound capture mode, and an off mode, and in case the acoustic mode of the earphone is set to the noise cancelation mode, the ambient sound capture mode, or the off mode, the control unit is configured to switch the path to the open state during the first operation.

11. An acoustic control method for an earphone which includes a housing having a space therein and having a path capable of ventilation from one end side on an external auditory canal side of a wearer to another end side on an ambient environment side, and a valve accommodated in the housing and configured to switch the path between an open state and a close state, the method comprising:

designating an acoustic mode of the earphone;

switching the path to the open state, regardless of the acoustic mode, during a first operation in a call including an operation in which an uttered voice of the wearer is collected by a microphone disposed on one end side of the housing and configured to collect the uttered voice of the wearer; and switching the path either the open state or the close state based on the acoustic mode during a second operation different from the first operation.

12. A computer readable storage medium on which a computer program causing a computer to execute the acoustic control method according to claim 11 is stored.

13. An earphone comprising:

a housing having a space therein and having a path capable of ventilation from one end side on an external auditory canal side of a wearer to another end side on an ambient environment side;

a valve accommodated in the housing and configured to switch the path between an open state and a close state;

a microphone disposed on one end side of the housing and configured to collect uttered voice of the wearer; and a processor configured to control the open state and the close state, control an acoustic mode of the earphone, switch the path to the open state, regardless of the acoustic mode, during a first operation in a call including an operation in which the uttered voice of the wearer is collected by the microphone, and switch the path either the open state or the close state based on the acoustic mode during a second operation different from the first operation.

* * * * *